(12) United States Patent
Wang et al.

(10) Patent No.: US 11,452,194 B2
(45) Date of Patent: Sep. 20, 2022

(54) DEVICE AND CIRCUIT FOR PROTECTING CONTROLLED LOADS, AND APPARATUS FOR SWITCHING BETWEEN LOADS

(71) Applicant: CONSUMER LIGHTING (U.S.), LLC, Norwalk, CT (US)

(72) Inventors: Pengfei Wang, Shanghai (CN); Xin Zhou, Shanghai (CN); Fanbin Wang, Shanghai (CN); Chengbin Liu, Shanghai (CN)

(73) Assignee: SAVANT TECHNOLOGIES LLC, East Cleveland, CT (US)

( * ) Notice: Subject to any disclaimer, the term of this patent is extended or adjusted under 35 U.S.C. 154(b) by 127 days.

(21) Appl. No.: 17/013,532

(22) Filed: Sep. 4, 2020

(65) Prior Publication Data

US 2021/0176849 A1 Jun. 10, 2021

(30) Foreign Application Priority Data

Dec. 4, 2019 (CN) .......................... 201911229890.2

(51) Int. Cl.
  *H02H 7/00* (2006.01)
  *H05B 47/24* (2020.01)
  *H02H 7/20* (2006.01)
  *H05B 45/50* (2022.01)
  *H05B 45/44* (2020.01)

(52) U.S. Cl.
  CPC .............. *H05B 47/24* (2020.01); *H02H 7/20* (2013.01); *H05B 45/44* (2020.01); *H05B 45/50* (2020.01)

(58) Field of Classification Search
  None
  See application file for complete search history.

(56) References Cited

U.S. PATENT DOCUMENTS

| | | | | |
|---|---|---|---|---|
| 9,848,475 | B2 * | 12/2017 | Turunen | H05B 45/397 |
| 10,588,188 | B2 * | 3/2020 | Jozef | H05B 45/44 |
| 10,743,385 | B2 * | 8/2020 | Safaee | H05B 45/38 |

* cited by examiner

*Primary Examiner* — Stephen W Jackson
(74) *Attorney, Agent, or Firm* — Wood IP LLC

(57) ABSTRACT

The disclosure relates to a device and a circuit for protecting controlled loads, and an apparatus for switching between the loads. The device includes: a plurality of load switches, comprising at least first and second load switches, wherein the first and second load switches are respectively in series connection with first and second controlled loads to form first and second controlled load branches in parallel connection, and each load switch is turned on when a switch control terminal is in a first voltage/current interval and turned off when the switch control terminal is in a second voltage/current interval; and a signal control module, including a signal control element, wherein the signal control element is switched between the switch control terminals of the first and second load switches for connection, and the signal control element enables, when being connected to the switch control terminal, the corresponding switch control terminal to be in the second voltage/current interval, and enables, when being disconnected from the switch control terminal, the corresponding control terminal to be in the first voltage/current interval.

19 Claims, 7 Drawing Sheets

(a)

(b)

(a)

(b)

DEVICE AND CIRCUIT FOR PROTECTING CONTROLLED LOADS, AND APPARATUS FOR SWITCHING BETWEEN LOADS

TECHNICAL FIELD

The present invention relates to the field of circuit control, and in particular to a device and a circuit for protecting controlled loads when switching between multiple paths of loads in the circuit, and an apparatus for switching between the loads including the circuit.

BACKGROUND

In a conventional art, there is a situation where a circuit has multiple paths of loads and switching to turn on different paths of loads in the multiple paths of loads under different conditions. For example, in a case of the load being a Light Emitting Diode (LED), there are LED products which enable switching between multiple paths of LED loads to turn on different LED loads. For example, in a device such as a printer, a switching circuit which enables switching between multiple buttons need to be provided.

In an existing circuit with the multiple paths of loads, when switching turned-on loads, for example, when switching from turning on one path of loads to turning on another path of loads, a corresponding switch is first switched from a closed state connecting to the one path of loads to an open state, and at this time, an over-voltage condition is generated in the circuit due to an open circuit, and when the switch is switched from the open state to a closed state connecting to another path of loads, the switching from the open circuit to a closed circuit will generate an instantaneous high pulsed current in the circuit. Both the over-voltage and the high pulsed current will cause damage to the loads in the circuit. Under the condition where the loads are LEDs, the LED product is prone to be damaged. As shown in FIG. 1, (a) of FIG. 1 illustrates an LED circuit with two paths of LED loads in parallel connection, wherein a switch is connected to one of the two paths of LED loads through switching between contacts A and B for connection. When the switch is switched from an open state to connection with the contact A or B, an instantaneous high pulsed current in the circuit is monitored, as shown in a solid line box in (b) of FIG. 1. The measured pulsed current reaches up to 726 mA, while the current in the circuit when the switch is in stable connection with the contact A or B is only 112 mA. The high pulsed current is easily to cause damage to the LED loads in the circuit.

At present, there is a technology which uses a buffer circuit to mitigate the over-voltage generated when switching between the loads. However, the over-voltage cannot be eliminated, and the high pulsed current generated during switching still exists. There is also a technology which suppresses the over-voltage and the high pulsed current generated when the switch is switching by means of setting logic for on and off time of the switch. However, such a technology requires setting the complex logic for the circuit, so that the circuit structure is complicated, the cost is increased, and problems of expensive manufacture cost, influence on other devices in the circuit and difficulty to eliminate noise at a high voltage are caused.

SUMMARY

The embodiments of the present application provide a device and a circuit for protecting controlled loads, and an apparatus for switching between the loads, to at least solve the problems of an over-voltage and a high pulsed current generated when the load is switched in the conventional art.

According to one aspect of the embodiments of the present application, a device for protecting controlled loads is provided, which includes: a plurality of load switches, comprising at least a first load switch and a second load switch, wherein the first load switch is in series connection with a first controlled load to form a first controlled load branch, the second load switch is in series connection with a second controlled load to form a second controlled load branch, the first controlled load branch is in parallel connection with the second controlled load branch, and each of the first load switch and the second load switch comprises a switch control terminal, and is turned on when a potential/current of a corresponding switch control terminal is in a first voltage/current interval and turned off when the potential/current of the corresponding switch control terminal is in a second voltage/current interval; and a signal control module, comprising a signal control element, wherein one end of the signal control element is switched between the switch control terminal of the first load switch and the switch control terminal of the second load switch for connection, and the end of the signal control element enables, when being connected to the switch control terminal of any of the first load switch and the second load switch, the potential/current of the corresponding switch control terminal to be in the second voltage/current interval and enables, when being disconnected from the switch control terminal of any of the first load switch and the second load switch, the potential/current of the corresponding switch control terminal to be in the first voltage/current interval.

In this way, when the signal control element is connected to the switch control terminal of the first load switch, the first load switch is turned off and thus the first controlled load branch is non-conductive; and when the signal control element is disconnected from the switch control terminal of the first load switch, the first load switch is turned on and thus the first controlled load branch is conductive. Accordingly, when the signal control element is connected to the switch control terminal of the second load switch, the second load switch is turned off and thus the second controlled load branch is non-conductive; and when the signal control element is disconnected from the switch control terminal of the second load switch, the second load switch is turned on and thus the second controlled load branch is conductive. Therefore, when a switching operation of disconnecting and then reconnecting between the first controlled load branch and the second controlled load branch of the circuit is performed by the signal control module, the circuit state first changes from one branch conductive to both the first controlled load branch and the second controlled load branch conductive, and then changes from the two branches conductive to another branch conductive.

With the device for protecting the controlled loads, as the signal control element is switched between the switch control terminal of the first load switch and the switch control terminal of the second load switch for connection, there is always at least one controlled load branch is in a conductive state during switching between the controlled load branches. Therefore, an open-circuit state in which all controlled load branches are disconnected from a power supply during switching conductive branches is eliminated, an over-voltage generated by switching from the conductive state to the open-circuit state and a high pulsed current generated by switching from the open-circuit state to the conductive state again are prevented, and thus the controlled loads in the circuit are protected from damage by the over-voltage and the pulsed current.

In this way, the over-voltage and the pulsed current generated in the circuit during the switch switching process are eliminated, and thus unlike the conventional art, additional Over-Voltage Protection (OVP) and pulsed current suppression measures do not need to be adopted, so that the circuit structure is simplified, and the cost is reduced.

In a schematic embodiment of the device for protecting the controlled loads, the signal control module further comprises a voltage control loop, the voltage control loop comprises at least a first voltage branch and a second voltage branch in parallel connection, each of the first voltage branch and the second voltage branch is provided with a power supply side load, one end of which is connected to a power supply of the voltage control loop, the other end of the power supply side load in the first voltage branch is connected to a first connection point, the other end of the power supply side load in the second voltage branch is connected to a second connection point, the first connection point is connected to the switch control terminal of the first load switch, and the second connection point is connected to the switch control terminal of the second load switch; and wherein the end of the signal control element is switched between the switch control terminal of the first load switch and the switch control terminal of the second load switch for connection through switching between the first connection point and the second connection point for connection.

In this way, when the signal control element is connected to the first connection point, the first load switch is turned off and thus the first controlled load branch is non-conductive; and when the signal control element is disconnected from the connection point, the first load switch is turned on and thus the first controlled load branch is conductive. Accordingly, when the signal control element is connected to the second connection point, the second load switch is turned off and thus the second controlled load branch is non-conductive; and when the signal control element is disconnected from the second connection point, the second load switch is turned on and thus the second controlled load branch is conductive.

In a schematic embodiment of the device for protecting the controlled loads, each of the first voltage branch and the second voltage branch is further provided with a ground load, and the first connection point and the second connection point are grounded respectively via the ground loads.

In this way, the potential of each of the first connection point and the second connection point is in a voltage/current interval when the connection point is connected to the signal control element, and the potential of each of the first connection point and the second connection point is at a partial potential of a power voltage borne by the ground load when the connection point is disconnected from the signal control element. By setting values for the power voltage, the power supply side load and the ground load in the voltage branch appropriately, the potential of each of the first connection point and the second connection point is in the second voltage/current interval for turning off the load switch when the connection point is connected to the signal control element, and the potential of each of the first connection point and the second connection point is in the first voltage/current interval for turning on the load switch when the connection point is disconnected from the signal control element, so the effect that when each of the first connection point and the second connection point is connected to the signal control element, the corresponding load switch is turned off, and when each of the first connection point and the second connection point is disconnected from the signal control element, the corresponding load switch is turned on can be implemented.

In a schematic embodiment of the device for protecting the controlled loads, the signal control element includes: a first voltage control switch in parallel connection with the ground load in the first voltage branch; a second voltage control switch in parallel connection with the ground load in the second voltage branch; and a signal control unit, wherein one end of the signal control unit is connected to the power supply of the voltage control loop; the other end of the signal control unit enables, when being connected to the switch control terminal of the first voltage control switch, the signal control element to be connected to the first connection point; and the other end of the signal control unit enables, when being connected to the switch control terminal of the second voltage control switch, the signal control element to be connected to the second connection point.

In this way, switching between the first connection point and the second connection point for connection by the signal control element can be implemented.

In a schematic embodiment of the device for protecting the controlled loads, the first voltage branch is formed by the power supply side load and the signal control element in series connection, and the second voltage branch is formed by the power supply side load and the signal control element in series connection.

In this way, the potential of each of the first connection point and the second connection point is in a voltage/current interval when the connection point is connected to the signal control element; and the potential of each of the first connection point and the second connection point is at a power potential of the voltage control loop when the connection point is disconnected from the signal control element, because when the connection point is disconnected from the signal control element, the voltage branch corresponding to the connection point is in an open circuit. By setting values for the power voltage, and the power supply side load in the voltage branch appropriately, the potential of each of the first connection point and the second connection point is in the second voltage/current interval for turning off the load switch when the connection point is connected to the signal control element, and the potential of each of the first connection point and the second connection point is in the first voltage/current interval for turning on the load switch when the connection point is disconnected from the signal control element, so the effect that when each of the first connection point and the second connection point is connected to the signal control element, the corresponding load switch is turned off, and when each of the first connection point and the second connection point is disconnected from the signal control element, the corresponding load switch is turned on can also be implemented.

In a schematic embodiment of the device for protecting the controlled loads, each of the first load switch and the second load switch comprises a Metal-Oxide-Semiconductor Field Effect Transistor (MOS tube), and the switch control terminal of each of the first load switch and the second load switch is a gate of the MOS tube; or each of the first load switch and the second load switch comprises a triode, and the switch control terminal of each of the first load switch and the second load switch is a base of the triode.

In this way, since the MOS tube or the triode is used as the load switch, the effect that when the potential/current of the switch control terminal of the load switch is in the first voltage/current interval, the load switch is turned on, and when the potential/current of the switch control terminal is in the second voltage/current interval, the load switch is turned off can be implemented.

In a schematic embodiment of the device for protecting the controlled loads, each of the first load switch and the second load switch further comprises any of a optical coupler, a relay and a silicon controlled rectifier.

In this way, since the MOS tube or the triode is combined with any of the optical coupler, the relay, and the silicon controlled rectifier to serve as the load switch, the advantages of electric isolation and strong anti-interference capability of the optical coupler, the advantages of adaptability to a large load and strong anti-interference capability of the relay, or the advantages of extremely quick response, strong anti-overload capability, no noise and high efficiency of the silicon controlled rectifier are further obtained, while the effect that when the potential/current of the switch control terminal of the load switch is in the first voltage/current interval, the load switch is turned on, and when the potential/current of the switch control terminal is in the second voltage/current interval, the load switch is turned off can be implemented.

In a schematic embodiment of the device for protecting the controlled loads, each of the first load switch and the second load switch comprises an N-type MOS tube, the first voltage/current interval is a voltage interval in which voltage is greater than or equal to a turn-on voltage of the N-type MOS tube, and the second voltage/current interval is a voltage interval in which voltage is smaller than the turn-on voltage of the N-type MOS tube.

In this way, in a case where the load switch is the N-type MOS tube, by setting the first voltage/current interval as a voltage interval in which voltage is greater than or equal to the turn-on voltage of the N-type MOS tube, and setting the second voltage/current interval as a voltage interval in which voltage is smaller than the turn-on voltage of the N-type MOS tube, the effect that when the potential/current of the switch control terminal of the load switch is in the first voltage/current interval, the load switch is turned on, and when the potential/current of the switch control terminal is in the second voltage/current interval, the load switch is turned off can be implemented.

In addition, when the load switch is a P type MOS tube, a triode, or any of the MOS tube and the triode combined with any of the optical coupler, the relay and the silicon controlled rectifier, the first voltage/current interval and the second voltage/current interval are appropriately set according to a switch characteristic of the corresponding load switch.

In a schematic embodiment of the device for protecting the controlled loads, each of the first voltage control switch and the second voltage control switch comprises a MOS tube, and the switch control terminal of each of the first voltage control switch and the second voltage control switch is a gate of the MOS tube; or each of the first voltage control switch and the second voltage control switch comprises a triode, and the switch control terminal of each of the first voltage control switch and the second voltage control switch is a base of the triode.

In this way, since the MOS tube or the triode is used as the voltage control switch, the effect that when the other end of the signal control unit is connected to the switch control terminal of the first voltage control switch, the signal control element is connected to the first connection point, and when the other end of the signal control unit is connected to the switch control terminal of the second voltage control switch, the signal control element is connected to the second connection point can be implemented. Therefore, when the switch control unit is connected to the switch control terminal of the first or second voltage control switch, the corresponding first or second controlled load branch is non-conductive; and when the switch control unit is disconnected from the switch control terminal of the first or second voltage control switch, the corresponding first or second controlled load branch is conductive.

According to another aspect of the embodiments of the present application, a circuit for protecting controlled loads is provided, which comprises: a plurality of controlled load branches in parallel connection, comprising at least a first controlled load branch and a second controlled load branch, wherein each controlled load branch is formed by a corresponding controlled load and a load switch in series connection, and each load switch comprises a switch control terminal and is turned on when a potential/current of the switch control terminal is in a first voltage/current interval and turned off when the potential/current of the switch control terminal is in a second voltage/current interval; and a signal control module, comprising a signal control element, wherein one end of the signal control element is switched between the switch control terminal of a first load switch in the first controlled load branch and the switch control terminal of a second load switch in the second controlled load branch for connection, and one end of the signal control element enables, when being connected to the switch control terminal of any of the first load switch and the second load switch, the potential/current of a corresponding switch control terminal to be in the second voltage/current interval and enables, when being disconnected from the switch control terminal of any of the first load switch and the second load switch, the potential/current of the corresponding switch control terminal to be in the first voltage/current interval.

In this way, when the signal control element is connected to the switch control terminal of the first load switch, the first load switch is turned off and thus the first controlled load branch is non-conductive; and when the signal control element is disconnected from the switch control terminal of the first load switch, the first load switch is turned on and thus the first controlled load branch is conductive. Accordingly, when the signal control element is connected to the switch control terminal of the second load switch, the second load switch is turned off and thus the second controlled load branch is non-conductive; and when the signal control element is disconnected from the switch control terminal of the second load switch, the second load switch is turned on and thus the second controlled load branch is conductive. Therefore, when a switching operation of disconnecting and then reconnecting between the first controlled load branch and the second controlled load branch of the circuit is performed by the signal control module, the circuit state first changes from one branch conductive to both the first controlled load branch and the second controlled load branch conductive, and then changes from the two branches conductive to another branch conductive.

With the circuit for protecting the controlled loads, there is always at least one controlled load branch is in a conductive state during switching between the controlled load branches. Therefore, an open-circuit state in which all controlled load branches are disconnected from a power supply during switching conductive branches is eliminated, an over-voltage generated by switching from the conductive state to the open-circuit state and a high pulsed current generated by switching from the open-circuit state to the conductive state again are prevented, and thus the controlled loads in the circuit are protected from damage by the over-voltage and the pulsed current. Therefore, unlike the conventional art, additional OVP and pulsed current suppression measures do not need to be adopted, so that the circuit structure is simplified, and the cost is reduced.

In a schematic embodiment of the circuit for protecting the controlled loads, the signal control module further includes a voltage control loop, the voltage control loop comprises at least a first voltage branch and a second voltage branch in parallel connection, each of the first voltage branch and the second voltage branch is provided with a power supply side load, one end of which is connected to a power supply of the voltage control loop, the other end of the power supply side load in the first voltage branch is connected to a first connection point, the other end of the power supply side load in the second voltage branch is connected to a second connection point, the first connection point is connected to the switch control terminal of the first load switch, and the second connection point is connected to the switch control terminal of the second load switch; and the end of the signal control element is switched between the switch control terminal of the first load switch and the switch control terminal of the second load switch for connection through switching between the first connection point and the second connection point for connection.

In this way, when the signal control element is connected to the first connection point, the first load switch is turned off and thus the first controlled load branch is non-conductive; and when the signal control element is disconnected from the connection point, the first load switch is turned on and thus the first controlled load branch is conductive. Accordingly, when the signal control element is connected to the second connection point, the second load switch is turned off and thus the second controlled load branch is non-conductive; and when the signal control element is disconnected from the second connection point, the second load switch is turned on and thus the second controlled load branch is conductive.

In a schematic embodiment of the circuit for protecting the controlled loads, each of the first voltage branch and the second voltage branch is further provided with a ground load, and the first connection point and the second connection point are grounded respectively via the ground loads.

In this way, the potential of each of the first connection point and the second connection point is in a voltage/current interval when the connection point is connected to the signal control element, and the potential of each of the first connection point and the second connection point is at a partial potential of a power voltage borne by the ground load when the connection point is disconnected from the signal control element. By setting values for the power voltage, the power supply side load and the ground load in the voltage branch appropriately, the potential of each of the first connection point and the second connection point is in the second voltage/current interval for turning off the load switch when the connection point is connected to the signal control element, and the potential of each of the first connection point and the second connection point is in the first voltage/current interval for turning on the load switch when the connection point is disconnected from the signal control element, so the effect that when each of the first connection point and the second connection point is connected to the signal control element, the corresponding load switch is turned off, and when each of the first connection point and the second connection point is disconnected from the signal control element, the corresponding load switch is turned on can be implemented.

In a schematic embodiment of the circuit for protecting the controlled loads, the signal control element comprises: a first voltage control switch in parallel connection with the ground load in the first voltage branch; a second voltage control switch in parallel connection with the ground load in the second voltage branch; and a signal control unit, wherein one end of the signal control unit is connected to the power supply of the voltage control loop; the other end of the signal control unit enables, when being connected to the switch control terminal of the first voltage control switch, the signal control element to be connected to the first connection point; and the other end of the signal control unit enables, when being connected to the switch control terminal of the second voltage control switch, the signal control element to be connected to the second connection point.

In this way, the signal control element switching between the first connection point and the second connection point for connection can be implemented.

In a schematic embodiment of the circuit for protecting the controlled loads, the first voltage branch is formed by the power supply side load and the signal control element in series connection, and the second voltage branch is formed by the power supply side load and the signal control element in series connection.

In this way, the potential of each of the first connection point and the second connection point is in a voltage/current interval when the connection point is connected to the signal control element; and the potential of each of the first connection point and the second connection point is at a power potential of the voltage control loop when the connection point is disconnected from the signal control element, because when the connection point is disconnected from the signal control element, the voltage branch corresponding to the connection point is in an open circuit. By setting values for the power voltage, and the power supply side load in the voltage branch appropriately, the potential of each of the first connection point and the second connection point is in the second voltage/current interval for turning off the load switch when the connection point is connected to the signal control element, and the potential of each of the first connection point and the second connection point is in the first voltage/current interval for turning on the load switch when the connection point is disconnected from the signal control element, so the effect that when each of the first connection point and the second connection point is connected to the signal control element, the corresponding load switch is turned off, and when each of the first connection point and the second connection point is disconnected from the signal control element, the corresponding load switch is turned on can also be implemented.

In a schematic embodiment of the circuit for protecting the controlled loads, each of the first load switch and the second load switch comprises an MOS tube, and the switch control terminal of each of the first load switch and the second load switch is a gate of the MOS tube; or each of the first load switch and the second load switch comprises a triode, and the switch control terminal of each of the first load switch and the second load switch is a base of the triode.

In this way, since the MOS tube or the triode is used as the load switch, the effect that when the potential/current of the switch control terminal of the load switch is in the first voltage/current interval, the load switch is turned on, and when the potential/current of the switch control terminal is in the second voltage/current interval, the load switch is turned off can be implemented.

In a schematic embodiment of the circuit for protecting the controlled loads, each of the first load switch and the second load switch further comprises any of a optical coupler, a relay and a silicon controlled rectifier.

In this way, since the MOS tube or the triode is combined with any of the optical coupler, the relay, and the silicon controlled rectifier to serve as the load switch, the advantages of electric isolation and strong anti-interference capability of the optical coupler, the advantages of adaptability to a large load and strong anti-interference capability of the relay, or the advantages of extremely quick response, strong anti-overload capability, no noise and high efficiency of the silicon controlled rectifier are further obtained, while the effect that when the potential/current of the switch control terminal of the load switch is in the first voltage/current interval, the load switch is turned on, and when the potential/current of the switch control terminal is in the second voltage/current interval, the load switch is turned off can be implemented.

In a schematic embodiment of the circuit for protecting the controlled loads, each of the first load switch and the second load switch comprises an N-type MOS tube, the first voltage/current interval is a voltage interval in which voltage is greater than or equal to a turn-on voltage of the N-type MOS tube, and the second voltage/current interval is a voltage interval in which voltage is smaller than the turn-on voltage of the N-type MOS tube.

In this way, in a case where the load switch is the N-type MOS tube, by setting the first voltage/current interval as a voltage interval in which voltage is greater than or equal to the turn-on voltage of the N-type MOS tube, and setting the second voltage/current interval as a voltage interval in which voltage is smaller than the turn-on voltage of the N-type MOS tube, the effect that when the potential/current of the switch control terminal of the load switch is in the first voltage/current interval, the load switch is turned on, and when the potential/current of the switch control terminal is in the second voltage/current interval, the load switch is turned off can be implemented.

In a schematic embodiment of the circuit for protecting the controlled loads, each of the first voltage control switch and the second voltage control switch comprises a MOS tube, and the switch control terminal of each of the first voltage control switch and the second voltage control switch is a gate of the MOS tube; or each of the first voltage control switch and the second voltage control switch comprises a triode, and the switch control terminal of each of the first voltage control switch and the second voltage control switch is a base of the triode.

In this way, since the MOS tube or the triode is used as the voltage control switch, the effect that when the other end of the signal control unit is connected to the switch control terminal of the first voltage control switch, the signal control element is connected to the first connection point, and when the other end of the signal control unit is connected to the switch control terminal of the second voltage control switch, the signal control element is connected to the second connection point can be implemented. Therefore, when the switch control unit is connected to the switch control terminal of the first or second voltage control switch, the corresponding first or second controlled load branch is non-conductive; and when the switch control unit is disconnected from the switch control terminal of the first or second voltage control switch, the corresponding first or second controlled load branch is conductive.

According to a still another aspect of the embodiments of the present application, an apparatus for switching between loads is further provided, which comprises: the circuit for protecting the controlled loads; a logic control module, configured to receive a control signal, and perform logic switch control on the circuit for protecting the controlled loads in response to the control signal; and a switch control module, configured to provide the logic control module with the control signal indicating switching between controlled load branches in the circuit.

In this way, the effect that turning on different controlled load branches by switching between a plurality of controlled load branches according to the control signal, while there is always at least one controlled load branch is in a conductive state during switching between the controlled load branches can be implemented. Therefore, an over-voltage generated by switching from the conductive state to the open-circuit state and a high pulsed current generated by switching from the open-circuit state to the conductive state are prevented.

The circuit for protecting the controlled loads and the apparatus for switching between the loads according to the embodiments of the present application may comprise further controlled load branches in addition to the first controlled load branch and the second controlled load branch; and the further controlled load branches are provided with further controlled loads respectively. As long as a corresponding signal control module comprising a signal control element for each controlled load branch is set to form the device for protecting the controlled loads, the open-circuit state in the circuit during switch switching can be eliminated, and thus the over-voltage generated by switching from the conductive state to the open-circuit state and a high pulsed current generated by switching from the open-circuit state to the conductive state are prevented.

In the device and circuit for protecting the controlled loads according to the embodiments of the present application, the signal control element may comprises a signal interface for receiving a voltage/current signal output from a signal source. As long as the circuit is so controlled that when the signal control element is connected to the switch control terminal of any of the first load switch and the second load switch, the signal output from the signal source and reaching to the switch control terminal via the signal control element is a voltage/current signal in the second voltage/current interval, and when the signal control element is disconnected from the switch control terminal of any of the first load switch and the second load switch, the signal output from the signal source and reaching to the switch control terminal is a voltage/current signal in the first voltage/current interval, the effect that when the signal control element is connected to the switch control terminal of the load switch, the corresponding controlled load branch is non-conductive, and when the signal control element is disconnected from the switch control terminal of the load switch, the corresponding controlled load branch is conductive can be implemented. Therefore, there is always at least one controlled load branch is in a conductive state during switching between the controlled load branches, open-circuit state of the circuit is prevented, and thus an over-voltage generated by switching from the conductive state to the open-circuit state and a high pulsed current generated by switching from the open-circuit state to the conductive state are prevented.

In the embodiments of the present application, a technical solution in which at least two controlled load branches are in parallel connection, when a signal control element switching between switch control terminals of load switches of the at least two branches for connection is connected to one switch control terminal, the corresponding controlled load branch is non-conductive, and when the signal control element is disconnected from the switch control terminal, the corresponding controlled load branch is conductive, so as to eliminate a situation where all controlled load branches in the circuit are disconnected from a power supply during a switch switching is provided, in order to at least solve technical problems of an over-voltage generated by switching from the conductive state to the open-circuit state and a high pulsed current generated by switching from the open-circuit state to the conductive state when a switch switches in the circuit comprising multiple paths of loads, and implement a technical effect that while the controlled loads in the circuit are protected from affection by the over-voltage and the high pulsed current, the circuit structure is simplified and the cost is reduced.

BRIEF DESCRIPTION OF THE DRAWINGS

The accompanying drawings are described here to provide a further understanding of the present application, and form a part of the present application. The schematic embodiments and description of the present application are adopted to explain the present application, and do not form improper limits to the present application. In the drawings.

In the figures:
Cir: controlled load loop
LED1: first controlled load
LED2: second controlled load
Q1: first load switch
Q2: second load switch
SW: signal control module
Sd: signal control element
Rs: power supply side load
Rg: ground load
C1: first connection point
C2: second connection point
A. B: contact
Q1': first voltage control switch
Q2': second voltage control switch
Su: signal control unit
OC1: optical coupler
MOS1: MOS tube
MOS2: MOS tube
RE1: Relay
RE2: Relay

DETAILED DESCRIPTION OF THE EMBODIMENTS

To make a person skilled in the art to better understand the solutions of the present application, the following clearly and completely describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

It should be noted that, terminologies such as "first" and "second" in the specification, claims and accompanying drawings of the present application are only used to distinguish similar objects, rather than to describe a special order or a precedence order. It should be understood that data used in such a way may be interchangeable in a certain cases, such that the embodiments of the present application described here can be implemented in an order other than those illustrated or described here. In addition, the terms "comprises," "comprising," "includes," "including," "has," "having" or any other variation thereof are intended to cover a non-exclusive inclusion. For example, a process, method, system, product or apparatus that includes a series of steps or module or units are not necessarily limited to only those steps or modules or units expressly listed but may include other steps or modules or units not expressly listed or inherent to such process, method, product or apparatus.

Figure 2:
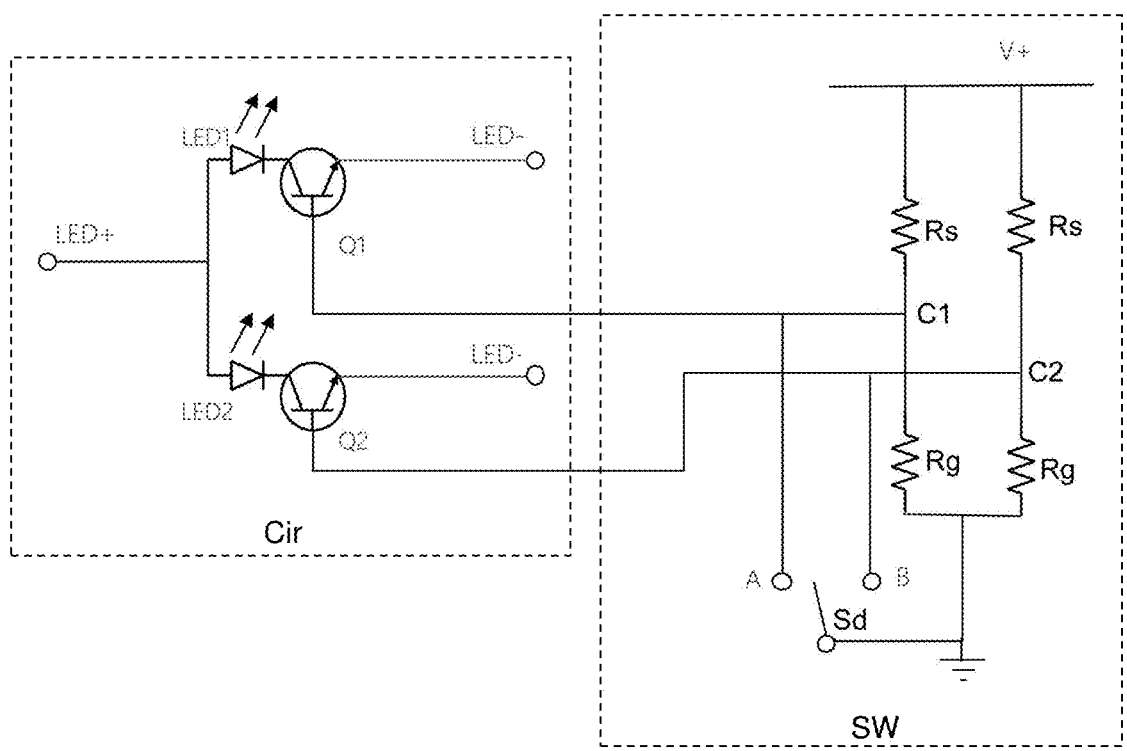
FIG. 2 is a circuit diagram of a circuit for protecting controlled loads according to an exemplary embodiment of the present application.

According to the embodiments of the present application, a device for protecting controlled loads and a circuit including the device for protecting the controlled loads are provided. FIG. 2 is a circuit diagram of a circuit for protecting controlled loads according to an exemplary embodiment of the present application. As shown in FIG. 2, the circuit for protecting the controlled loads includes: a controlled load loop Cir, and a signal control module SW.

The controlled load loop Cir includes a first controlled load branch and a second controlled load branch in parallel connection. The first controlled load branch includes a first controlled load LED1 and a first load switch Q1 in series connection; and the second controlled load branch includes a second controlled load LED2 and a second load switch Q2 in series connection. The controlled load loop Cir supplies power to the first controlled load LED1 and the second controlled load LED2 by supplying power between an LED+ and two LED−.

The signal control module SW includes a grounded signal control element Sd and a voltage control loop. The voltage control loop includes a first voltage branch and a second voltage branch in parallel connection; and each of the first voltage branch and the second voltage branch is provided with a power supply side load Rs, one end of which is connected to a power supply of the voltage control loop. The other end of the power supply side load Rs in the first voltage branch is connected to a first connection point C1, the other end of the power supply side load Rs in the second voltage branch is connected to a second connection point C2, the first connection point C1 is connected to the switch control terminal of the first load switch Q1, and the second connection point C2 is connected to the switch control terminal of the second load switch Q2. The other end of the signal control element Sd is switched between contacts A and B for connection, and thus being switched between the first connection point C1 and the second connection point C2 for connection. Each of the first voltage branch and the second voltage branch is further provided with a ground load Rg, and the first connection point C1 and the second connection point C2 are grounded respectively via the ground loads Rg. Each of the first connection point C1 and the second connection point C2 is at a zero potential when being connected to the signal control element Sd and is at a partial potential borne by the ground load Rg when being disconnected from the signal control element Sd.

The signal control module SW, and the first load switch Q1 and the second load switch Q2 in the controlled load loop Cir constitute the device for protecting the controlled loads. The device for protecting the controlled loads is also referred to as a switch block.

The first load switch Q1 and the second load switch Q2 shown in FIG. 2 are N-type MOS tubes. An N-type MOS tube is turned on when the voltage at its gate is greater than or equal to a turn-on voltage, and turned off when the voltage at its gate is smaller than the turn-on voltage. By setting the values for the power voltage V+, the power supply side load Rs and the ground load Rg in the voltage loop appropriately so that the partial potential borne by the ground load Rg is greater than or equal to the turn-on voltage of the N-type MOS tube, it can be achieved that when the signal control element Sd is connected to the contact A, that is, the signal control element Sd is connected to the first connection point C1, the first connection point C1 is at the zero potential, and the switch control terminal of the first load switch Q1 connected to the first connection point C1 is also at the zero potential which is smaller than the turn-on voltage; and therefore, the first load switch Q1 is turned off, the first controlled load branch is in the open-circuit state, and the first controlled load LED1 is disconnected from the power supply. At this time, the signal control element Sd is not connected to the contact B, so that the potential at the second connection point C2 is the partial potential borne by the ground load Rg, that is, the switch control terminal of the second load switch Q2 connected to the second connection point C2 is also at the partial potential borne by the ground load Rg which is greater than or equal to the turn-on voltage, and thus the second load switch Q2 is turned on, that is, the second controlled load branch is conductive.

When the signal control element Sd is switching from in connection with the contact A to in connection with the contact B, the signal control element Sd is first disconnecting from the contact A. At this time, as neither the first connection point C1 nor the second connection point C2 is connected to the signal control element Sd, the switch control terminals of the first load switch Q1 and the second load switch Q2 are at the partial potential borne by the ground load Rg, and both the first load switch Q1 and the second load switch Q2 are turned on, that is, both the first controlled load LED1 and the second controlled load LED2 are turned on. Then, the signal control element Sd is switching from an open state to being connected to the contact B. When the signal control element Sd is connected to the contact B, the first controlled load branch is conductive correspondingly, and the second controlled load branch is disconnected from the power supply.

In this way, when a switching operation is performed by the signal control element Sd, the state of the circuit for protecting the controlled loads changes from one controlled load branch conductive to both the first controlled load branch and the second controlled load branch conductive, and then changes from the two controlled load branches conductive to the other controlled load branch conductive. Therefore, it is assured that there is always controlled load branch/branches is/are in a conductive state during switching, an open-circuit state of the circuit during the switch switching is eliminated, an over-voltage generated by switching from the conductive state to the open-circuit state and a high pulsed current generated by switching from the open-circuit state to the conductive state are prevented, and thus the controlled loads in the circuit are protected from damage by the over-voltage and the pulsed current.

In addition, in this way, since the over-voltage and the pulsed current generated in the circuit during the switching of the signal control element are eliminated, unlike the conventional art, additional OVP and pulsed current suppression measures do not need to be adopted, so that the circuit structure is simplified, and the cost is reduced.

It is to be noted that although the first load switch Q1 and the second load switch Q2 are shown as the MOS tubes, and the switch control terminals of the first load switch Q1 and the second load switch Q2 are respectively shown as the gates of the corresponding MOS tubes in the exemplary embodiment of FIG. 2, a person skilled in the art will understand that any switch device may be used as the first load switch and the second load switch, provided that the switch device is turned on when the potential/current of the switch control terminal thereof is in an first voltage/current interval and turned off when the potential/current of the switch control terminal thereof is in an second voltage/current interval.

In another exemplary embodiment, the first load switch and the second load switch are triodes, and the switch control terminals are bases of the triodes. When a current at the base of a triode is zero, currents at both the collector and the emitter of the triode are zero, and the triode is in a cut-off state, that is, the open state. When the current at the base is increased to a certain current, the currents at the collector and the emitter of the triode are in a saturated state, that is, the triode is turned on. In a still another exemplary embodiment, the first load switch and the second load switch are a combination of any of the MOS tube and the triode and any of an optical coupler, a relay and a silicon controlled rectifier.

It is to be noted that, in the exemplary embodiment of FIG. 2, the signal control element Sd is shown as a single-pole double-throw switch. However, a person skilled in the art will understand that switch in other forms capable of switching between contacts for connection may also be adopted. In addition, in a case where the controlled load loop Cir further includes additional controlled load branches, a single-pole triple-throw switch and the like may further be adopted.

Figure 3:
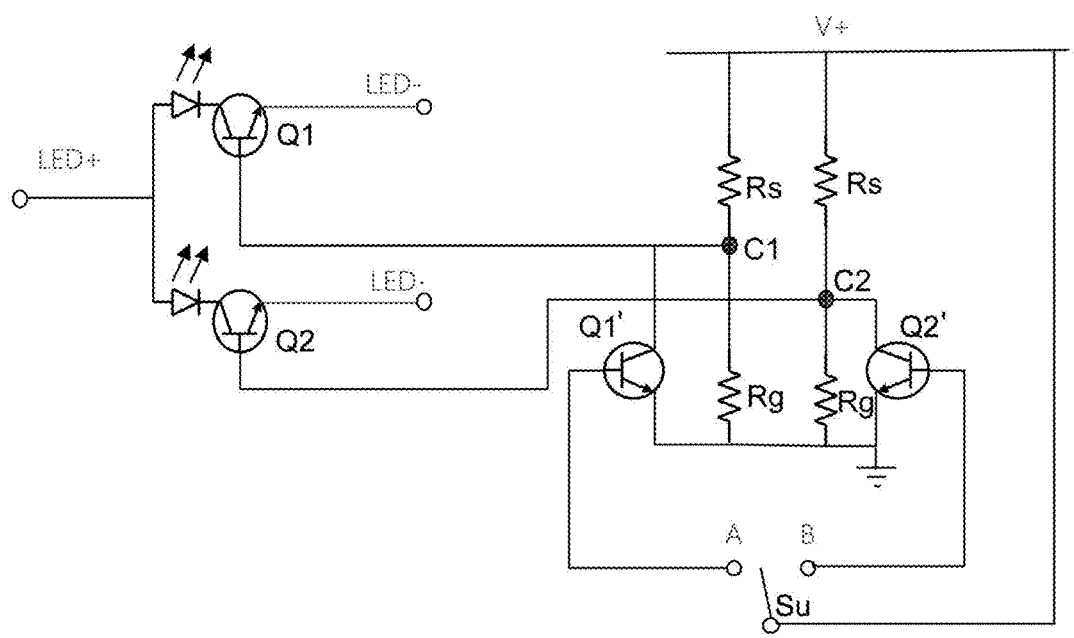
FIG. 3 is a circuit diagram of a circuit for protecting controlled loads according to another exemplary embodiment of the present application.

FIG. 3 is a circuit diagram of a circuit for protecting controlled loads according to another exemplary embodiment of the present application. The circuit for protecting the controlled loads shown in FIG. 3 and the circuit for protecting the controlled loads shown in FIG. 2 include the same controlled load loop Cir and voltage control loop. The description on these components is referred to the embodiment shown in FIG. 2 and will no longer be repeated herein.

Only the signal control element shown in FIG. 3 which is different from the signal control element Sd shown in FIG. 2 is described.

The signal control element in the circuit for protecting the controlled loads shown in FIG. 3 includes: a first voltage control switch Q1' in parallel connection with the ground load Rg in the first voltage branch, a second voltage control switch Q2' in parallel connection with the ground load Rg in the second voltage branch, and a signal control unit Su. One end of the signal control unit Su is connected to the power supply of the voltage control loop, and the other end of the signal control unit Su is switchable between the switch control terminal of the first voltage control switch Q1' and the switch control terminal of the second voltage control switch Q2' for connection by switching between the contacts A and B for connection. When the other end of the signal control unit Su is connected to the contact A, that is, connected to the switch control terminal of the first voltage control switch Q1', the signal control element is connected to the first connection point C1; and when the other end of the signal control unit Su is connected to the contact B, that is, connected to the switch control terminal of the second voltage control switch Q2', the signal control element is connected to the second connection point C2.

In this way, switching between the first connection point and the second connection point for connection by the signal control element can also be implemented. When the signal control element is connected to the contact A or B, the corresponding first load switch Q1 or second load switch Q2 is turned off, and thus the corresponding first controlled load LED1 or second controlled load LED2 is turned off; and when the signal control element is disconnected from the contact A or B, the corresponding first load switch Q1 or second load switch Q2 is turned on, and thus the corresponding first controlled load LED1 or second controlled load LED2 is turned on.

When a switching operation is performed by the signal control element, the state of the circuit for protecting the controlled loads changes from one controlled load branch conductive to both the first controlled load branch and the second controlled load branch conductive, and then changes from the two controlled load branches conductive to the other controlled load branch conductive. Therefore, an open-circuit state of the circuit during a switch switching can also be eliminated, and thus an over-voltage generated by switching from the conductive state to the open-circuit state and a high pulsed current generated by switching from the open-circuit state to the conductive state are prevented.

It is to be noted that, in the exemplary embodiment of FIG. 3, the first voltage control switch Q1' and the second voltage control switch Q2' are shown as the MOS tubes, and the switch control terminal of the first voltage control switch Q1' and the switch control terminal of the second voltage control switch Q2' are shown as the gates of the MOS tubes. However, the person skilled in the art will understand that other contact-less switch devices such as triodes whose ON and OFF state can be controlled by controlling its voltage or current may also be adopted. In the exemplary embodiment of FIG. 3, the signal control unit Su is shown as a single-pole double-throw switch. However, the person skilled in the art will understand that switch in other forms capable of switching between contacts for connection may also be adopted.

Figure 4:
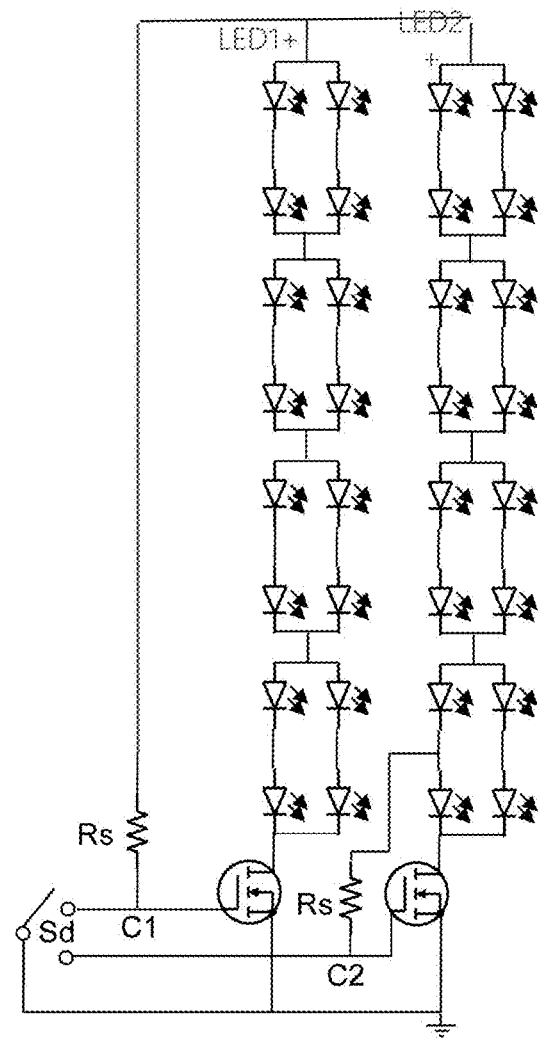
FIG. 4 is a circuit diagram of a circuit for protecting controlled loads according to a still another exemplary embodiment of the present application.

FIG. 4 is a circuit diagram of a circuit for protecting controlled loads according to a still another exemplary embodiment of the present application. The main difference between the circuit for protecting the controlled loads shown in FIG. 4 and the circuit for protecting the controlled loads shown in FIG. 2 lies in: in the circuit shown in FIG. 4, each of the first voltage branch and the second voltage branch in the voltage control loop is formed by the power supply side load Rs and the signal control element Sd in series connection; while in the circuit shown in FIG. 2, each of the first voltage branch and the second voltage branch in the voltage control loop is formed by the power supply side load Rs and the ground load Rg in series connection.

In this way, each of the first connection point C1 and the second connection point C2 is at the zero potential when being connected to the signal control element Sd, and each of the first connection point C1 and the second connection point C2 is at the power potential of the voltage control loop when being disconnected from the signal control element Sd, because when an connection point is disconnected from the signal control element Sd, the voltage branch corresponding to the connection point is in an open circuit.

Therefore, the effect that when the switching operation is performed by the signal control element Sd, the state of the circuit for protecting the controlled loads changes from one controlled load branch conductive to both the first controlled load branch and the second controlled load branch conductive, and then changes from the two controlled load branches conductive to the other controlled load branch conductive can also be implemented. In other words, there is always at least one controlled load branch is in a conductive state during switching between the controlled load branches, an open-circuit state of the circuit during the switch switching is eliminated, and thus an over-voltage generated by switching from the conductive state to the open-circuit state and a high pulsed current generated by switching from the open-circuit state to the conductive state are prevented.

Another difference between the circuit for protecting the controlled loads shown in FIG. 4 and the circuit for protecting the controlled loads shown in FIG. 2 lies in: in the circuit shown in FIG. 4, both the first controlled load and the second controlled load are formed by a plurality of LED units in series and parallel connections, and the voltage control loop and the controlled load loop share a common power supply.

In this way, the load on each controlled load branch may be extended to satisfy various use requirements; meanwhile, with the use of the single common power supply, the circuit structure is simplified and the cost is reduced.

Figure 5:
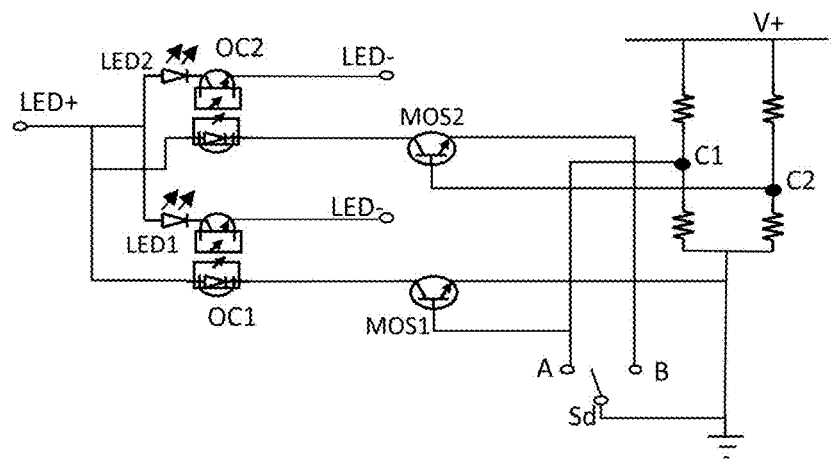
FIG. 5 is a circuit diagram of a circuit for protecting controlled loads according to a still another exemplary embodiment of the present application.

FIG. 5 is a circuit diagram of a circuit for protecting controlled loads according to a still another exemplary embodiment of the present application. The circuit for protecting the controlled loads shown in FIG. 5 and the circuit for protecting the controlled loads shown in FIG. 2 include the same signal control module. The description on the module is referred to the embodiment shown in FIG. 2 and will no longer be repeated herein. The difference between the circuit for protecting the controlled loads shown in FIG. 5 and the circuit for protecting the controlled loads shown in FIG. 2 lies in that the load switch used is different. The load switch in FIG. 2 is shown as the MOS tube, and the load switch in FIG. 5 is shown as a combination of the MOS tube and the optical coupler.

The first load switch shown in FIG. 5 in the circuit for protecting the controlled loads includes the optical coupler OC1 and the MOS tube MOS1 in series connection. The gate of the MOS tube MOS1 serves as the switch control terminal of the first load switch, the primary edge of the optical coupler OC1 is in series connection with the MOS tube MOS1, and the secondary edge of the optical coupler OC1 is in series connection with the controlled load LED1. When the signal control element Sd is connected to the contact A, the first connection point C1 is at the zero potential, so that the gate of the MOS tube MOS1 connected to the first connection point C1 is also at the zero potential, and thus the MOS tube MOS1 is turned off; no current passes through the primary edge of the optical coupler OC1, so the secondary edge of the optical coupler OC1 is turned off, that is, the first controlled load branch is non-conductive. When the signal control element Sd is disconnected from the contact A, the first connection point C1 is at the partial potential borne by the ground load. By setting the values for the power voltage, the power supply side load and the ground load on the voltage branch appropriately so that the partial potential borne by the ground load is greater than or equal to the turn-on potential of the MOS tube MOS1, it can be achieved that the MOS tube MOS1 is turned on and a certain current passes through the primary edge of the optical coupler OC1. By selecting parameters of the optical coupler OC1 appropriately so that the secondary edge in saturated conduction at this moment, the first controlled load branch is conductive. In the same way, when the signal control element Sd is connected to the contact B, the MOS tube MOS2 is turned off and thus the second controlled load branch is non-conductive; and when the signal control element Sd is disconnected from the contact B, the MOS tube MOS2 is turned on and thus the second controlled load branch is conductive.

In this way, by using the combination of the MOS tube and the optical coupler as the load switch, the advantages of electric isolation and strong anti-interference capability of the optical coupler are obtained, while the effect that when the potential/current of the switch control terminal of the load switch is in the first voltage/current interval, the load switch is turned on, and when the potential/current of the switch control terminal is in the second voltage/current interval, the load switch is turned off can be implemented.

Figure 6:
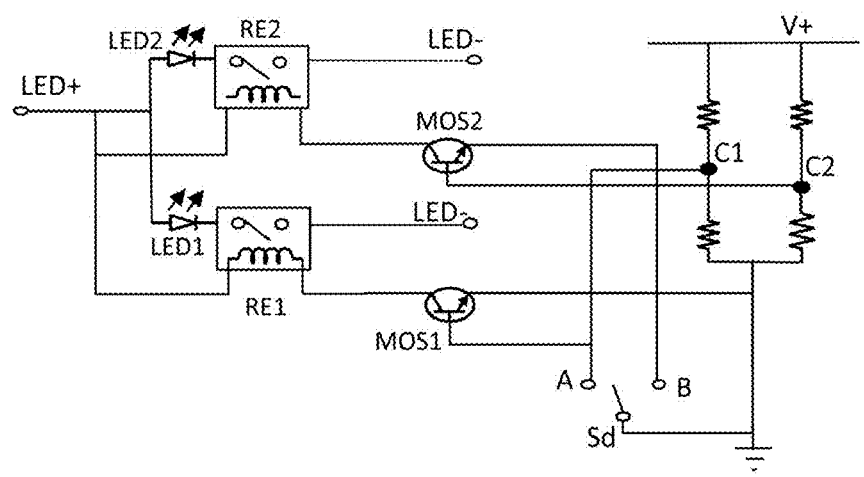
FIG. 6 is a circuit diagram of a circuit for protecting controlled loads according to a still another exemplary embodiment of the present application.

FIG. 6 is a circuit diagram of a circuit for protecting controlled loads according to a still another exemplary embodiment of the present application. The circuit for protecting the controlled loads shown in FIG. 6 and the circuit for protecting the controlled loads shown in FIG. 2 include the same signal control module. The description on the module is referred to the embodiment shown in FIG. 2 and will no longer be repeated herein. The difference between the circuit for protecting the controlled loads shown in FIG. 6 and the circuit for protecting the controlled loads shown in FIG. 2 lies in that the load switch used is different. The load switches in FIG. 2 are shown as the MOS tubes, and the load switches in FIG. 6 are shown as combinations of the MOS tubes and the relays.

The first load switch shown in FIG. 6 in the circuit for protecting the controlled loads includes the relay RE1 and the MOS tube MOS1 in series connection. The gate of the MOS tube MOS1 serves as the switch control terminal of the first load switch, the input side of the relay RE1 is in series connection with the MOS tube MOS1, and the output side of the relay RE1 is in series connection with the controlled load LED1. When the signal control element Sd is connected to the contact A, the first connection point C1 is at the zero potential, so that the gate of the MOS tube MOS1 connected to the first connection point C1 is also at the zero potential, and thus the MOS tube MOS1 is turned off; no current passes through a coil at the input side of the relay RE1, so a static contact at the output side is also in the open state, and the first controlled load branch is non-conductive. When the signal control element Sd is disconnected from the contact A, the first connection point C1 is at the partial potential borne by the ground load. By setting the values for the power voltage, the power supply side load and the ground load on the voltage branch appropriately so that the partial potential borne by the ground load is greater than or equal to the turn-on potential of the MOS tube MOS1, the MOS tube MOS1 is turned on and a certain current passes through the input side of the relay RE1; and by setting the value of the current appropriately, the output side of the relay RE1 is turned on, that is, the first controlled load branch is conductive. In the same way, when the signal control element Sd is connected to the contact B, the static contact of the relay RE2 is turned off and thus the second controlled load branch is non-conductive; and when the signal control element Sd is disconnected from the contact B, the static contact of the relay RE2 is turned on and thus the second controlled load branch is conductive.

In this way, by using the combination of the MOS tube and the relay as the load switch, the advantages of adaptability to a large load and strong anti-interference capability of the relay are obtained, while the effect that when the potential/current of the switch control terminal of the load switch is in the first voltage/current interval, the load switch is turned on, and when the potential/current of the switch control terminal is in the second voltage/current interval, the load switch is turned off can be implemented.

In addition, the person skilled in the art should understand that the combination of the MOS tube and an silicon controlled rectifier, an triode, or the combination of the triode and any of the optical coupler, the relay and the silicon controlled rectifier may further be used as the load switch, provided that the first voltage/current interval for turning on the load switch and the second voltage/current interval for turning off the load switch are appropriately set according to the switch characteristic of the corresponding load switch.

Figure 1:
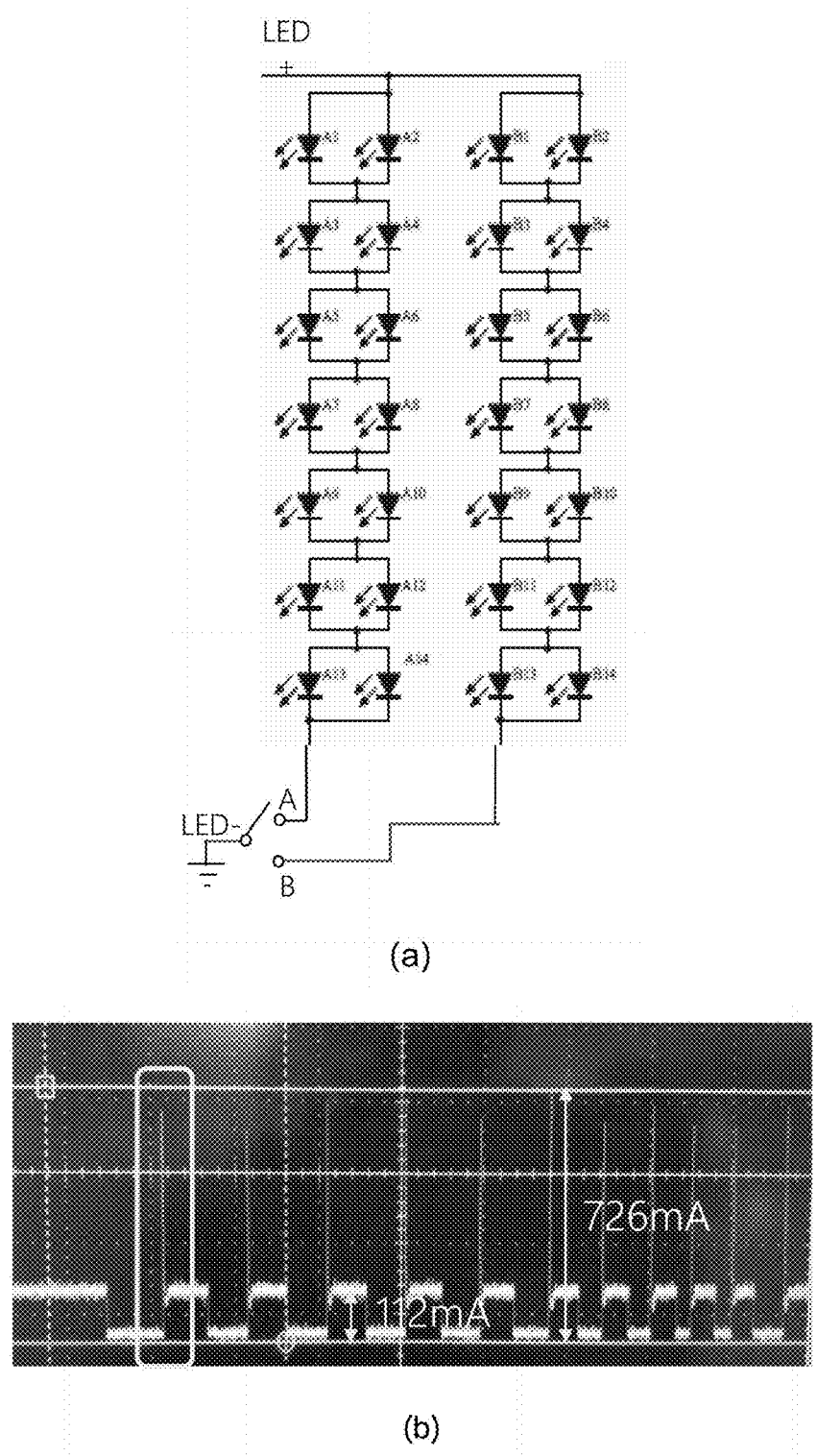
FIG. 1 is a circuit diagram of an LED circuit for switching between multiple paths of LED loads for connection and an oscillogram of a measured current in the circuit during a switch switching according to the conventional art.
Figure 7:
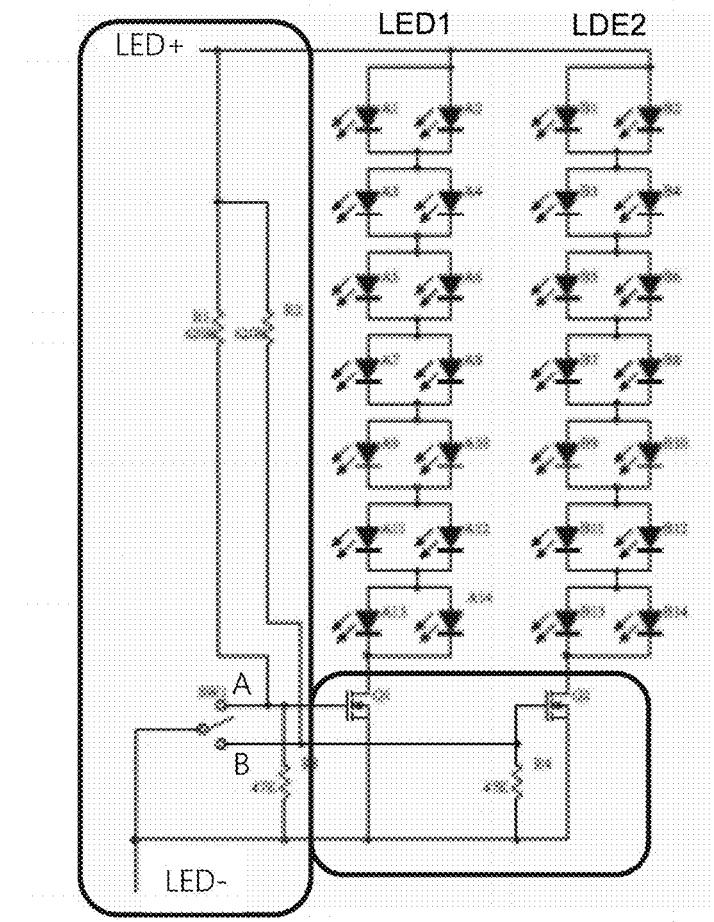
FIG. 7 is a circuit diagram of a circuit for protecting controlled loads and an oscillogram of a measured current in the circuit during a switch switching according to an exemplary embodiment of the present application.
Figure 7:
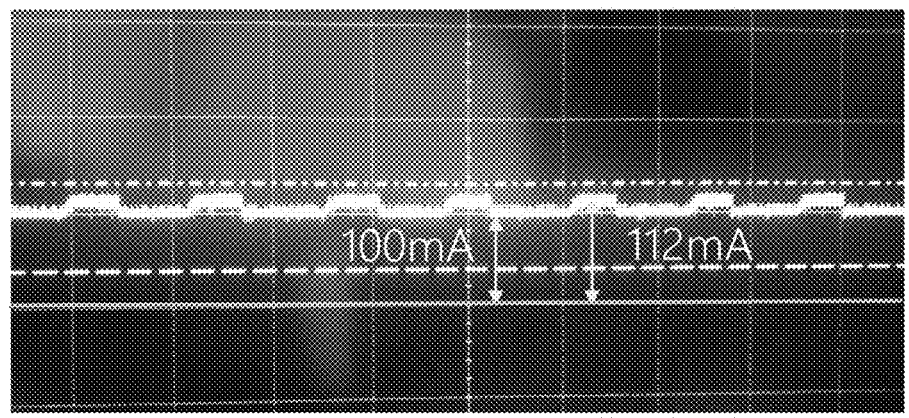

FIG. 7 is a circuit diagram of a circuit for protecting controlled loads and an oscillogram of a measured current in the circuit during a switch switching according to an exemplary embodiment of the present application. (a) of FIG. 7 illustrates a circuit diagram of a circuit for protecting controlled loads according to an exemplary embodiment of the present application. The solid line box in (a) of FIG. 7 illustrates a difference from the circuit shown in (a) of FIG. 1. (b) of FIG. 7 illustrates an oscillogram of a measured current in the circuit during a switch switching.

As shown in (a) of FIG. 7, when the switch in the circuit is connected to the contact A, the first controlled load LED1 corresponding to the contact A is turned off, and the second controlled load LED2 corresponding to the contact B is turned on. When the switch in the circuit is connected to the contact B, the second controlled load LED2 corresponding to the contact B is turned off, and the first controlled load LED1 corresponding to the contact A is turned on. When the switch in the circuit is in an open state, that is, the switch is neither connected to the contact A nor connected to the contact B, both the first controlled load LED1 and the second controlled load LED2 are turned on.

(b) of FIG. 7 illustrates an oscillogram of a measured current in the circuit when a switch in the circuit is switching between contacts A and B. As can be seen from (b) of FIG. 7, when the switch is switching between a closed state and an open state, the current in the circuit is switching between 112 mA and 100 mA. Particularly, as compared with (b) of FIG. 1, the high pulsed current occurred in the circuit when the switch is switching from the open state to the closed state is eliminated.

In the exemplary embodiments shown in FIG. 2 to FIG. 7, the controlled loads are shown as the LEDs. However, the person skilled in the art should understand that the controlled loads in the specification are not limited to the LEDs, and may be various loads capable of working in a power-on state.

Figure 8:
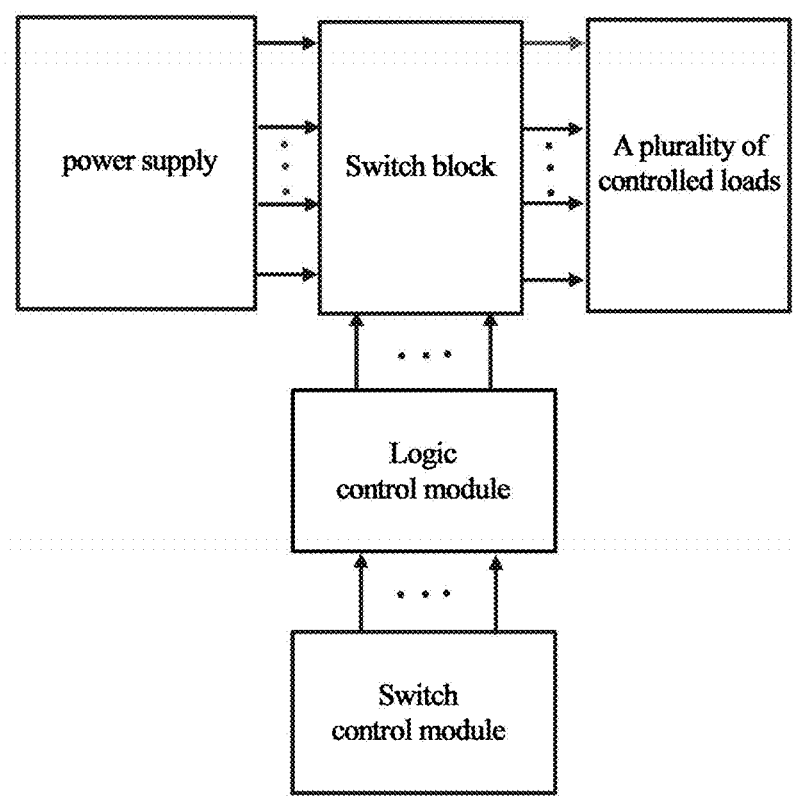
FIG. 8 is a block diagram of an apparatus for switching between loads according to an embodiment of the present application.

FIG. 8 is a block diagram of an apparatus for switching between loads according to an embodiment of the present application. As shown in FIG. 8, the apparatus for switching between the loads includes: a circuit for protecting controlled loads, a logic control module, and a switch control module.

The circuit for protecting the controlled loads includes a plurality of controlled load branches and a signal control module; each controlled load branch is formed by a load switch for each controlled load and the corresponding each controlled load in series connection; the plurality of controlled load branches are in parallel connection; a switch control terminal of each load switch is turned on when being at some potential/current or in some potential/current interval, and turned off when being at another potential/current or in another potential/current interval; and the plurality of load switches and the signal control module constitute a switch block.

The logic control module implements logic switch control on the switch block.

The switch control module implements the switching of control signals and provides the logic control module with the control signal.

In this way, the apparatus for switching between the loads includes at least two controlled load branches. During switching by the switch control module, it is assured that there is always at least one controlled load branch is in a conductive state in any case, and the situation where all controlled loads are disconnected from a power supply will not occur. Therefore, the generation of an over-voltage and an impact current during switching the controlled load branches is prevented so as not to damage the controlled loads.

In this embodiment, the signal control module is included in the switch block, and the signal control module may be the signal control module SW in any of exemplary embodiments shown in FIG. 2 to FIG. 7.

In this embodiment, the switch control module provides the logic control module with the control signal indicating switching between controlled load branches in the circuit, so that different one or more controlled load branches may be turned on. The logic control module performs logic switch control on the circuit for protecting the controlled loads in response to the control signal, which causes the ON/OFF state of the circuit switched from the current one or more controlled load branches conductive to the different one or more controlled load branches conductive. In an exemplary embodiment, the logic control unit is a Microprogrammed Control Unit (MCU). In another exemplary embodiment, the logic control unit is a control circuit formed by multiple MOS tubes.

In this embodiment, the apparatus for switching between the loads further includes a power supply, which is configured to supply a power to the control module, the switch block and the controlled loads.

In the above embodiments of the present application, the description on each embodiment has its preference, and the part not detailed in some embodiments may be referred to related description on other embodiments.

In the several embodiment provided by the present application, it should be understood that the disclosed technical content may be implemented via other manners. The apparatus embodiment described above is only schematic, and for example, division of the units or modules is only logic function division, and other division manners may be adopted during practical implementation. For example, multiple units or modules or components may be combined or integrated into another system, or some characteristics may be neglected or not executed.

The above are only preferred embodiments of the present application. It should be pointed out that the person of ordinary skill in the art may further make multiple modifications and changes without departing from the principle of the present application, and those improvements and changes are also should be considered as the protection scope of the present application.

What is claimed is:

1. A device for protecting controlled loads, comprising:
a plurality of load switches, comprising at least a first load switch and a second load switch, wherein the first load switch is in series connection with a first controlled load to form a first controlled load branch, the second load switch is in series connection with a second controlled load to form a second controlled load branch, the first controlled load branch is in parallel connection with the second controlled load branch, and each of the first load switch and the second load switch comprises a switch control terminal, and is turned on when a potential/current of a corresponding switch control terminal is in a first voltage/current interval and turned off when the potential/current of the corresponding switch control terminal is in a second voltage/current interval; and
a signal control module, comprising a signal control element, wherein one end of the signal control element is switched between the switch control terminal of the first load switch and the switch control terminal of the second load switch for connection, and the end of the signal control element enables, when being connected to the switch control terminal of any of the first load switch and the second load switch, the potential/current of the corresponding switch control terminal to be in the second voltage/current interval and enables, when being disconnected from the switch control terminal of any of the first load switch and the second load switch, the potential/current of the corresponding switch control terminal to be in the first voltage/current interval.

2. The device according to claim 1, wherein the signal control module further comprises a voltage control loop, the voltage control loop comprises at least a first voltage branch and a second voltage branch in parallel connection, each of the first voltage branch and the second voltage branch is provided with a power supply side load, one end of which is connected to a power supply of the voltage control loop, the other end of the power supply side load in the first voltage branch is connected to a first connection point, the other end of the power supply side load in the second voltage branch is connected to a second connection point, the first connection point is connected to the switch control terminal of the first load switch, and the second connection point is connected to the switch control terminal of the second load switch; and
wherein the end of the signal control element is switched between the switch control terminal of the first load switch and the switch control terminal of the second load switch for connection through switching between the first connection point and the second connection point for connection.

3. The device according to claim 2, wherein each of the first voltage branch and the second voltage branch is further provided with a ground load, and the first connection point and the second connection point are grounded respectively via the ground loads.

4. The device according to claim 3, wherein the signal control element comprises:
   a first voltage control switch in parallel connection with the ground load in the first voltage branch;
   a second voltage control switch in parallel connection with the ground load in the second voltage branch; and
   a signal control unit, wherein one end of the signal control unit is connected to the power supply of the voltage control loop, the other end of the signal control unit enables, when being connected to the switch control terminal of the first voltage control switch, the signal control element to be connected to the first connection point, and the other end of the signal control unit enables, when being connected to the switch control terminal of the second voltage control switch, the signal control element to be connected to the second connection point.

5. The device according to claim 2, wherein the first voltage branch is formed by the power supply side load and the signal control element in series connection, and the second voltage branch is formed by the power supply side load and the signal control element in series connection.

6. The device according to claim 1, wherein each of the first load switch and the second load switch comprises a MOS tube, and the switch control terminal of each of the first load switch and the second load switch is a gate of the MOS tube; or each of the first load switch and the second load switch comprises a triode, and the switch control terminal of each of the first load switch and the second load switch is a base of the triode.

7. The device according to claim 1, wherein each of the first load switch and the second load switch further comprises any of an optical coupler, a relay and a silicon controlled rectifier.

8. The device according to claim 6, wherein each of the first load switch and the second load switch comprises an N-type MOS tube, the first voltage/current interval is a voltage interval in which voltage is greater than or equal to a turn-on voltage of the N-type MOS tube, and the second voltage/current interval is a voltage interval in which voltage is smaller than the turn-on voltage of the N-type MOS tube.

9. The device according to claim 4, wherein each of the first voltage control switch and the second voltage control switch comprises a MOS tube, and the switch control terminal of each of the first voltage control switch and the second voltage control switch is a gate of the MOS tube; or each of the first voltage control switch and the second voltage control switch comprises a triode, and the switch control terminal of each of the first voltage control switch and the second voltage control switch is a base of the triode.

10. A circuit for protecting controlled loads, comprising:
    a plurality of controlled load branches in parallel connection, comprising at least a first controlled load branch and a second controlled load branch, wherein each controlled load branch is formed by a corresponding controlled load and a load switch in series connection, and each load switch comprises a switch control terminal and is turned on when a potential/current of the switch control terminal is in a first voltage/current interval and turned off when the potential/current of the switch control terminal is in a second voltage/current interval; and
    a signal control module, comprising a signal control element, wherein one end of the signal control element is switched between the switch control terminal of a first load switch in the first controlled load branch and the switch control terminal of a second load switch in the second controlled load branch for connection, and the end of the signal control element enables, when being connected to the switch control terminal of any of the first load switch and the second load switch, the potential/current of a corresponding switch control terminal to be in the second voltage/current interval and enables, when being disconnected from the switch control terminal of any of the first load switch and the second load switch, the potential/current of the corresponding switch control terminal to be in the first voltage/current interval.

11. The circuit according to claim 10, wherein the signal control module further comprises a voltage control loop, the voltage control loop comprises at least a first voltage branch and a second voltage branch in parallel connection, each of the first voltage branch and the second voltage branch is provided with a power supply side load, one end of which is connected to a power supply of the voltage control loop, the other end of the power supply side load in the first voltage branch is connected to a first connection point, the other end of the power supply side load in the second voltage branch is connected to a second connection point, the first connection point is connected to the switch control terminal of the first load switch, and the second connection point is connected to the switch control terminal of the second load switch; and
    wherein the end of the signal control element is switched between the switch control terminal of the first load switch and the switch control terminal of the second load switch for connection through switching between the first connection point and the second connection point for connection.

12. The circuit according to claim 11, wherein each of the first voltage branch and the second voltage branch is further provided with a ground load, and the first connection point and the second connection point are grounded respectively via the ground loads.

13. The circuit according to claim 12, wherein the signal control element comprises:
    a first voltage control switch in parallel connection with the ground load in the first voltage branch;
    a second voltage control switch in parallel connection with the ground load in the second voltage branch; and
    a signal control unit, wherein one end of the signal control unit is connected to the power supply of the voltage control loop, the other end of the signal control unit enables, when being connected to the switch control terminal of the first voltage control switch, the signal control element to be connected to the first connection point, and the other end of the signal control unit enables, when being connected to the switch control terminal of the second voltage control switch, the signal control element to be connected to the second connection point.

14. The circuit according to claim 11, wherein the first voltage branch is formed by the power supply side load and the signal control element in series connection, and the second voltage branch is formed by the power supply side load and the signal control element in series connection.

15. The circuit according to claim 10, wherein each of the first load switch and the second load switch comprises a MOS tube, and the switch control terminal of each of the first load switch and the second load switch is a gate of the MOS tube; or each of the first load switch and the second load switch comprises a triode, and the switch control terminal of each of the first load switch and the second load switch is a base of the triode.

16. The circuit according to claim 10, wherein each of the first load switch and the second load switch further comprises any of an optical coupler, a relay and a silicon controlled rectifier.

17. The circuit according to claim 15, wherein each of the first load switch and the second load switch comprises an N-type MOS tube, the first voltage/current interval is a voltage interval in which voltage is greater than or equal to a turn-on voltage of the N-type MOS tube, and the second voltage/current interval is a voltage interval in which voltage is smaller than the turn-on voltage of the N-type MOS tube.

18. The circuit according to claim 13, wherein each of the first voltage control switch and the second voltage control switch comprises a MOS tube, and the switch control terminal of each of the first voltage control switch and the second voltage control switch is a gate of the MOS tube; or each of the first voltage control switch and the second voltage control switch comprises a triode, and the switch control terminal of each of the first voltage control switch and the second voltage control switch is a base of the triode.

19. An apparatus for switching between loads, comprising:
- the circuit for protecting the controlled loads according to claim 10;
- a logic control module, configured to receive a control signal, and perform logic switch control on the circuit for protecting the controlled loads in response to the control signal; and
- a switch control module, configured to provide the logic control module with the control signal indicating switching between controlled load branches in the circuit.

* * * * *